(12) United States Patent
DeCrescenzo et al.

(10) Patent No.: US 8,371,597 B2
(45) Date of Patent: Feb. 12, 2013

(54) BOX TRAILER ACCESS DEVICE

(75) Inventors: Dale E. DeCrescenzo, Carthage, MO (US); Corey W. Harris, Carthage, MO (US)

(73) Assignee: L&P Property Management Company, South Gate, CA (US)

( * ) Notice: Subject to any disclaimer, the term of this patent is extended or adjusted under 35 U.S.C. 154(b) by 276 days.

(21) Appl. No.: 12/938,465

(22) Filed: Nov. 3, 2010

(65) Prior Publication Data

US 2012/0104720 A1    May 3, 2012

(51) Int. Cl.
*B60R 3/00* (2006.01)
(52) U.S. Cl. .................... 280/164.1; 280/163
(58) Field of Classification Search ........... 280/164.1, 280/166, 163; 105/443; 182/82; 296/75
See application file for complete search history.

(56) References Cited

U.S. PATENT DOCUMENTS

| | | | |
|---|---|---|---|
| 5,007,654 A | | 4/1991 | Sauber |
| 5,024,292 A | * | 6/1991 | Gilbreath et al. ............... 182/90 |
| 5,687,813 A | * | 11/1997 | Bensch .......................... 182/127 |
| 6,170,843 B1 | * | 1/2001 | Maxwell et al. ............... 280/166 |
| 6,237,927 B1 | * | 5/2001 | Debo ............................. 280/166 |
| 6,474,668 B2 | * | 11/2002 | Debo ............................. 280/166 |
| 6,918,624 B2 | | 7/2005 | Miller et al. |
| 7,090,276 B1 | * | 8/2006 | Bruford et al. ................... 296/62 |
| D585,350 S | * | 1/2009 | Coletti ......................... D12/203 |
| 7,673,922 B1 | * | 3/2010 | Grimes .......................... 296/62 |
| 7,954,836 B2 | * | 6/2011 | Mann ............................. 280/163 |
| 8,322,739 B1 | * | 12/2012 | Fair et al. ..................... 280/164.1 |
| 2009/0322052 A1 | * | 12/2009 | Ruehl ............................ 280/166 |
| 2010/0164196 A1 | * | 7/2010 | Collins ......................... 280/166 |
| 2010/0320713 A1 | * | 12/2010 | Mann ............................ 280/163 |
| 2011/0168491 A1 | * | 7/2011 | Cheatham, Jr. ............... 182/106 |
| 2012/0104721 A1 | * | 5/2012 | Genest et al. ................ 280/166 |

* cited by examiner

*Primary Examiner* — J. Allen Shriver, II
*Assistant Examiner* — Andrew Khouzam
(74) *Attorney, Agent, or Firm* — Wood, Herron & Evans, LLP

(57) ABSTRACT

An apparatus for assisting a person get into and exit an interior of a truck trailer. The apparatus comprises multiple parts, including a stationary step having a U-shape and a handle movable between an upright and stowed position. In its stowed position, the handle does not extend beyond the rear of the trailer, enabling the trailer to back up to a loading dock without interference from the handle. Two latching mechanisms assist in locking the handle in its upright and stowed positions. In its upright position, the handle enables a person standing on the step to more easily enter and exit the interior of the trailer.

20 Claims, 7 Drawing Sheets

BOX TRAILER ACCESS DEVICE

FIELD OF THE INVENTION

This invention relates generally to a device for assisting a person entering and exiting the interior of a truck trailer and the process of operating the device.

BACKGROUND OF THE INVENTION

When a tractor trailer is parked adjacent a loading dock or shipping bay, a person may walk directly into the interior of the trailer from the loading dock. In this manner, it is relatively easy to load product into the interior of the trailer and/or unload product from inside the interior of the trailer.

However, when the tractor trailer is parked at another location away from a loading dock or shipping bay, it is difficult for a person to enter the interior of the trailer from a starting point standing on the ground. Additionally, it is difficult for the person to exit the interior of the trailer in order to get back on the ground. This is especially true when the person is carrying an item which occupies his or her hands.

Accordingly, there is a need for an apparatus which enables a person to enter or exit the interior of a tractor trailer safely.

There is further a need for a device which facilitates the entry and exit from a standing position on the ground to a position inside the interior of a tractor trailer.

SUMMARY OF THE INVENTION

One aspect of the present invention comprises an apparatus adapted to mount to a truck trailer having a trailer floor and a safety bumper spaced below the trailer floor. The apparatus comprises a mounting plate secured to the trailer and a guide block secured to the mounting plate extending downwardly from the mounting plate. The apparatus further comprises a generally U-shaped step secured to the mounting plate. The U-shaped step is located between the trailer floor and the safety bumper. The apparatus further comprises a handle movable between an upright position and a stowed position, wherein the handle may be locked in either of the positions using a pair of latch block assemblies. Each latch block assembly includes a spring loaded plunger adapted to engage a hole in the handle. Regardless of its position, a portion of the handle passes through an opening in the guide block. The handle may move from front to back which enables the handle to be stowed out of the way in its stowed position.

According to another aspect of this invention, an apparatus for assisting a person into and out of an interior of a truck trailer comprises a mounting plate secured to the trailer. The apparatus further comprises a guide block secured to one end of the mounting plate and extending downwardly from the mounting plate. The apparatus further comprises a generally U-shaped step secured to the mounting plate and a handle extending through the guide block. The handle is movable between an upright position and a stowed position. The handle may be locked in one of the positions by a spring loaded plunger.

BRIEF DESCRIPTION OF THE DRAWINGS

The objectives and features of the present invention will become more readily apparent when the following detailed description of the drawings is taken in conjunction with the accompanying drawings in which.

DETAILED DESCRIPTION OF THE DRAWINGS

Figure 1:
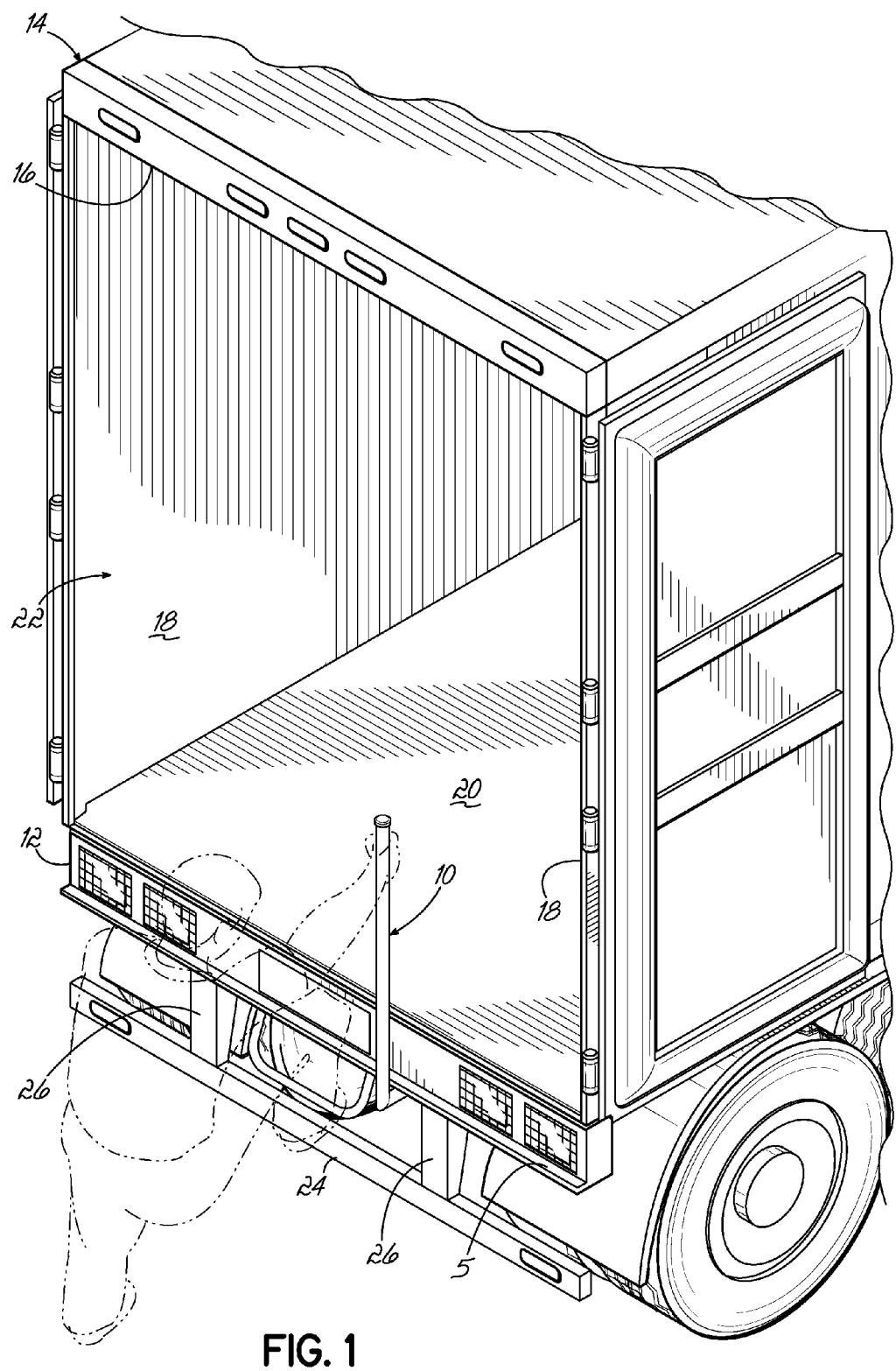
FIG. 1 is a perspective view of a rear portion of a truck trailer, the apparatus of the present invention being secured to the truck trailer.
Figure 2:
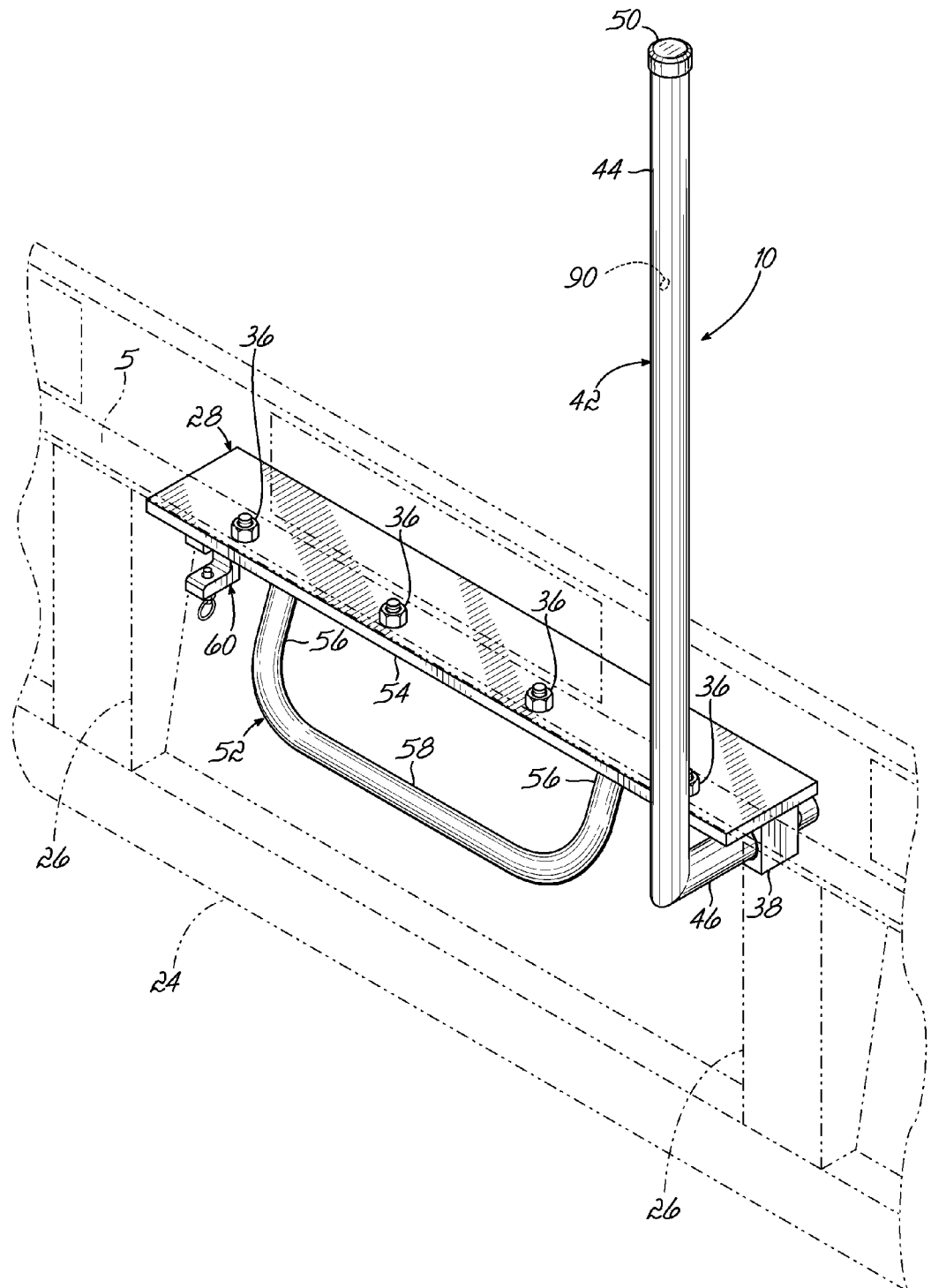
FIG. 2 is an enlarged perspective view of the apparatus of FIG. 1.

Referring to the drawings, and particularly to FIG. 1, an apparatus 10 adapted to mount to a rear portion 12 of a truck or box trailer 14 is illustrated. The truck trailer 14 has a top 16, sides 18 and a floor 20 defining an interior 22. As best shown in FIGS. 1 and 2, the truck trailer 14 has a horizontally oriented bumper 24 mounted to the trailer with spaced mounting posts 26.

Figure 3:
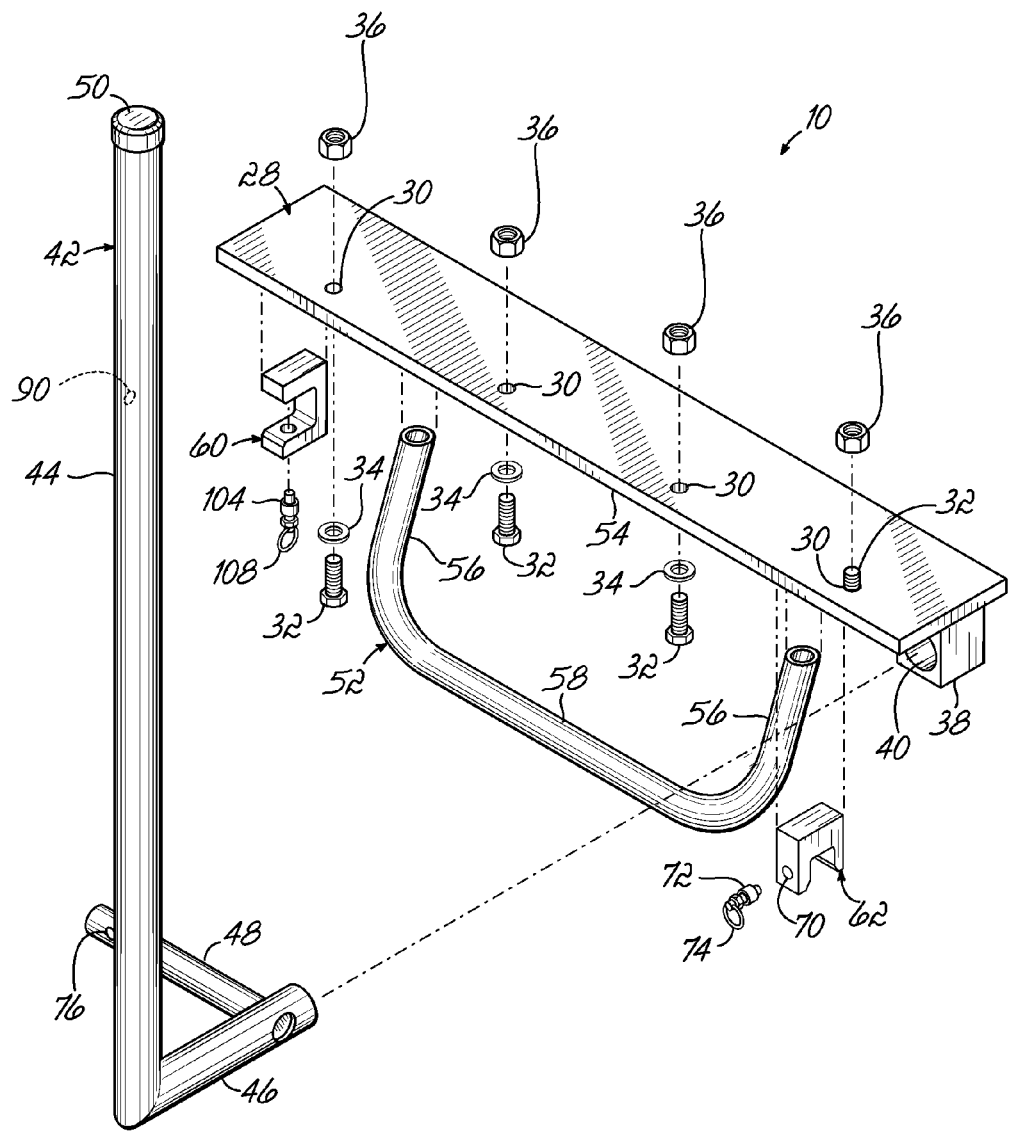
FIG. 3 is a disassembled view of the apparatus of FIG. 1.

The apparatus 10 is shown disassembled in FIG. 3. The apparatus 10 is shown assembled and secured to the truck trailer 14 in FIG. 2. As best illustrated in FIG. 3, apparatus 10 comprises a generally rectangular mounting plate 28 having a plurality of holes 30 therethrough. A plurality of fasteners in the form of threaded bolts 32 pass through the holes 30 and have washers 34 between the heads of the bolts 32 and the mounting plate 28. Nuts 36 having threaded interiors receive the ends of the bolts 32 and may be tightened in conventional fashion to secure the mounting plate 28 to a plate 5 of the trailer 14 as shown in FIG. 2. Although four fasteners are illustrated securing the mounting plate 28 to the trailer 14, as shown in FIGS. 2 and 3, any number of fasteners may be used.

Figure 4:
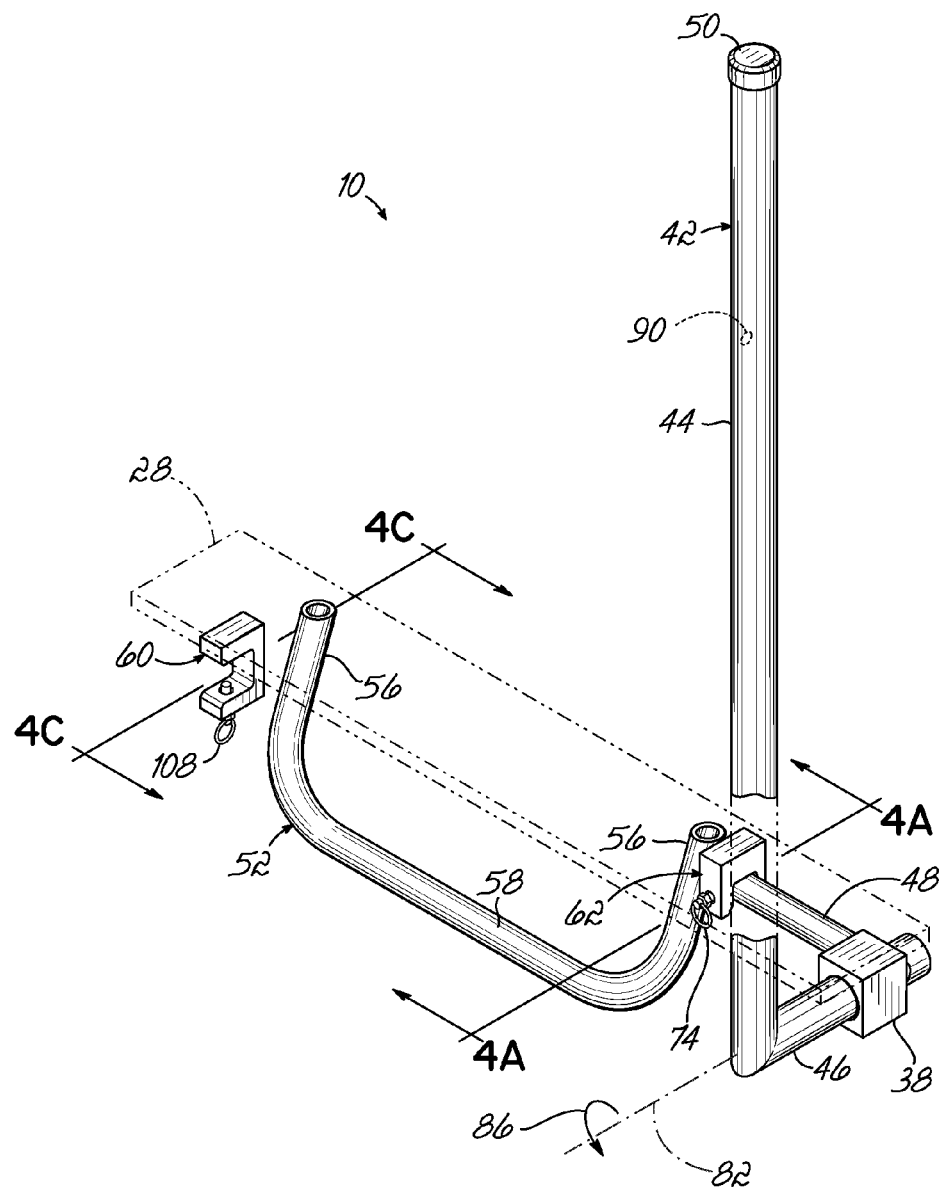
FIG. 4 is a perspective view of a portion of the apparatus of FIG. 1, the handle being in an upright position.

The apparatus 10 further comprises a guide block 38 welded or otherwise secured to one end (to the right in FIGS. 2 and 3) of the mounting plate 28 and extending downwardly from the mounting plate 28. As best shown in FIG. 4, the guide block 38 is shown as being generally shaped like a six-sided cube; however it may assume other shapes or configurations. A hole 40 extends through the guide block 38 and is sized to slidably receive and retain a portion of a handle 42 as shown in FIG. 4 and described herein.

As best illustrated in FIG. 3, the handle 42 comprises three different linear portions, a main portion 44, a guide portion 46 extending through the hole 40 in the guide block 38 and a tail portion 48. The guide portion 46 extends outwardly from one end of the main portion 44 in a direction perpendicular to the direction of the main portion 44. Similarly, the tail portion 48 extends outwardly from one end of the guide portion 46 in a direction perpendicular to the direction of the guide portion 46. A cap 50 is shown located at one end (the top) of the main portion 44. The handle 42 is movable between an upright position shown in FIG. 4 and a collapsed position shown in FIG. 6. The handle 42 may be locked in either of its extreme positions in a manner described below. Although the handle 42 is illustrated comprising multiple pieces joined together, it may be one piece of material.

The apparatus 10 further comprises a generally U-shaped step 52 of tubular material welded or otherwise secured to a lower surface 54 of the mounting plate 28. The generally U-shaped step 52 comprises a pair of side portions 56 and a bottom portion 58. As illustrated in FIG. 2, generally U-shaped step 52 is located below the truck trailer mounting plate 5 and above the bumper 24 and between the mounting posts 26.

The apparatus 10 further comprises first and second latch block assemblies 60, 62 welded or otherwise secured to a lower surface 54 of the mounting plate 28. First latch block assembly 60 is shown in the drawings on the left side of the mounting plate 28, while second latch block assembly 62 is shown in the drawings on the right side of the mounting plate 28.

Figure 4A:
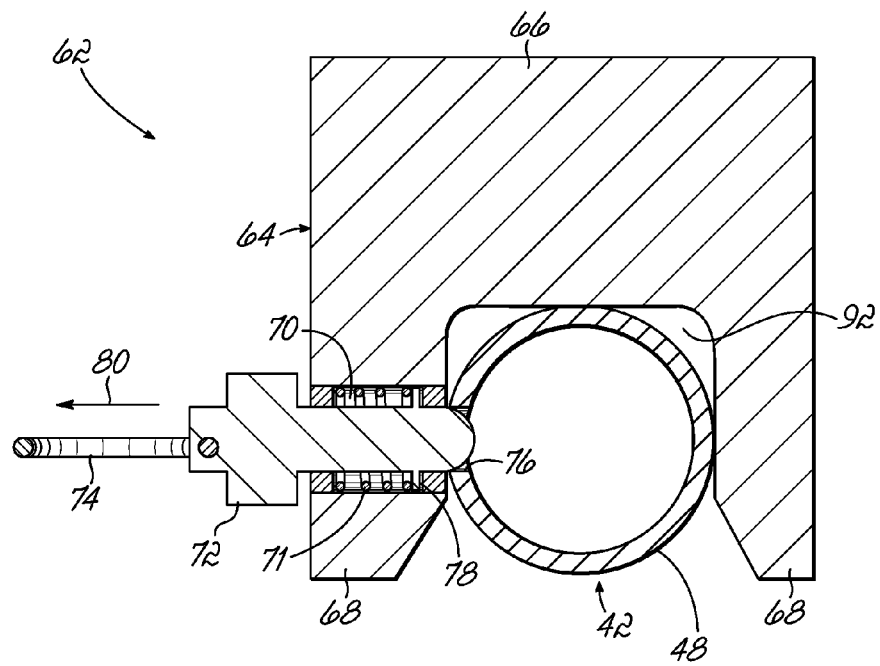
FIG. 4A is a cross-sectional view of a portion of the apparatus of FIG. 4 taken along the line 4A-4A.
Figure 4B:
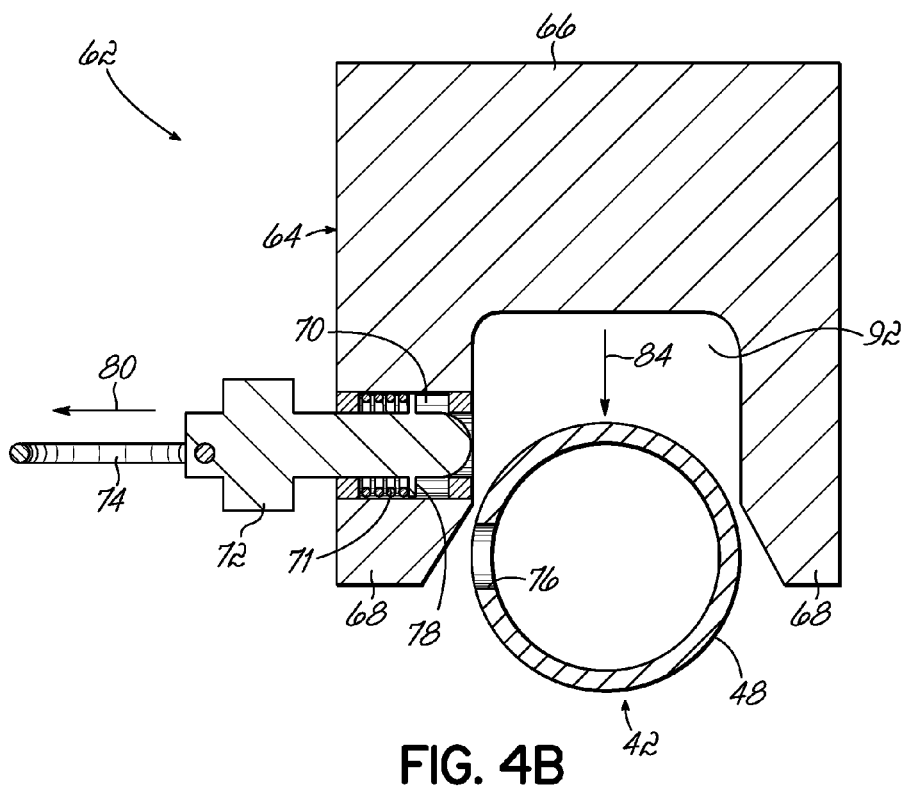
FIG. 4B is a view like FIG. 4A showing the plunger of the latch block assembly of FIG. 4A in an unlatched position.

FIGS. 4A and 4B illustrate latch block assembly 62 in detail. Latch block assembly 62 comprises a generally U-shaped latch block 64 comprising a main portion 66 and two leg portions 68 extending outwardly from the main portion 66 and defining a gap 92 therebetween. One of the leg portions 68 has an opening 70 therethrough. A spring 71 is located in the opening 70 along with a plunger 72 having a flange 78. A ring 74 is secured to the plunger 72 and is used to pull the plunger 72 out of its engaged position shown in FIG. 4A. In its engaged position, the plunger 72 is received with a hole 76 within the tail portion 48 of handle 42 and used to lock handle 42 in its upright position shown in FIG. 4.

Figure 4C:
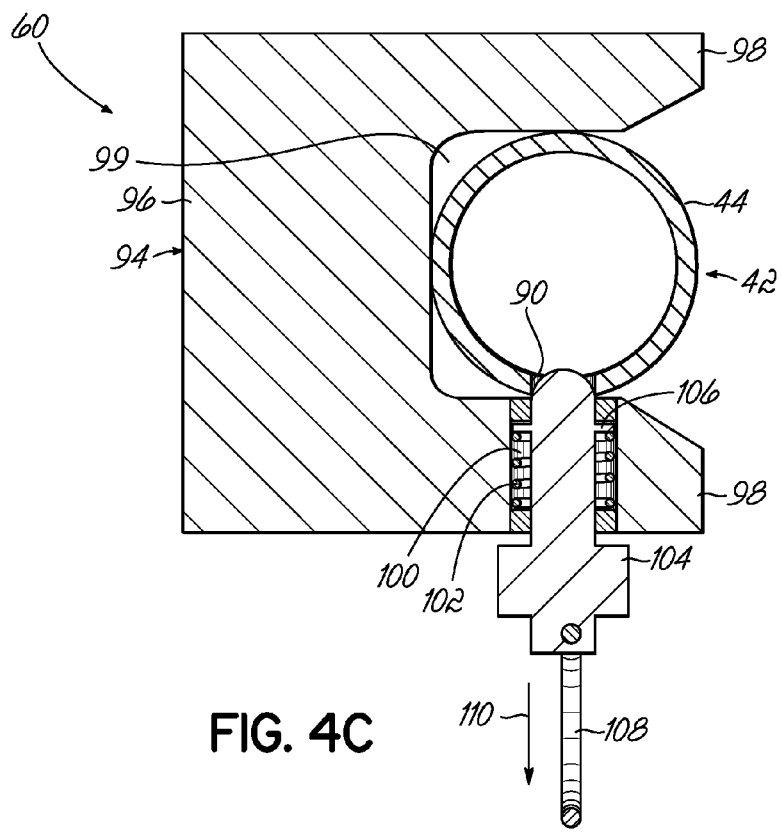
FIG. 4C is a cross-sectional view of a portion of the apparatus of FIG. 4 taken along the line 4C-4C.
Figure 4D:
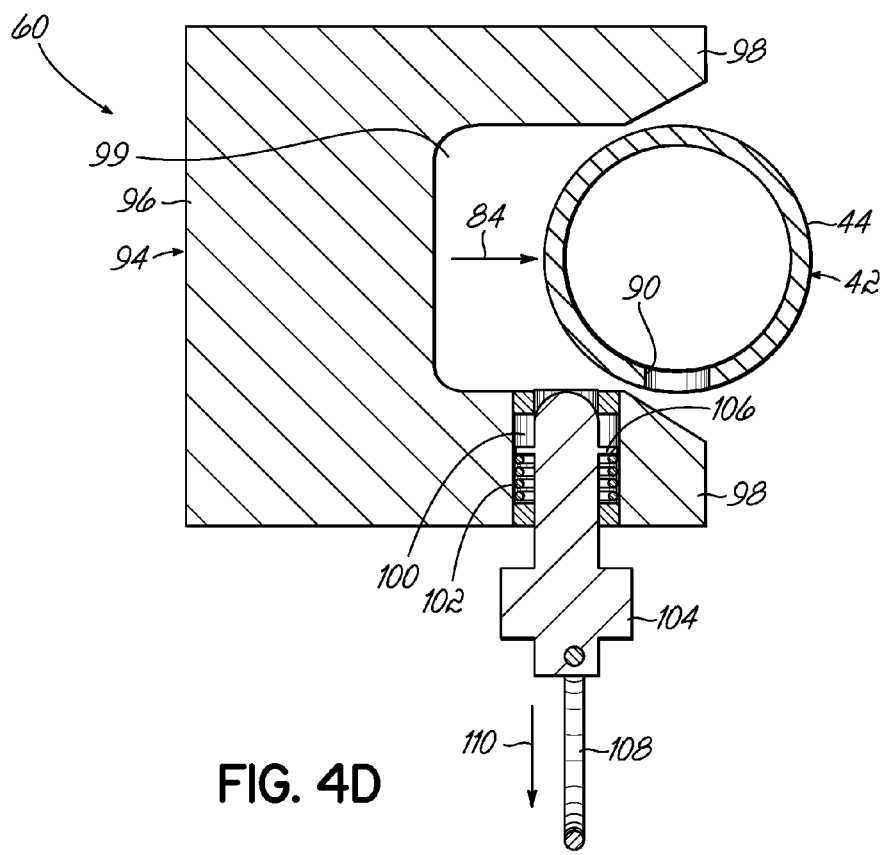
FIG. 4D is a view like FIG. 4C showing the plunger of the latch block assembly of FIG. 4C in an unlatched position.

FIGS. 4C and 4D illustrate latch block assembly 60 in detail. Latch block assembly 60 comprises a generally U-shaped latch block 94 comprising a main portion 96 and two leg portions 98 extending outwardly from the main portion 96 and defining a gap 99 therebetween. One of the leg portions 98 has an opening 100 therethrough. A spring 102 is located in the opening 100 along with a plunger 104 having a flange 106. A ring 108 is secured to the plunger 104 and is used to pull the plunger 104 out of its engaged position shown in FIG. 4C. In its engaged position, the plunger 104 is received with a hole 90 within the main portion 44 of handle 42 and used to lock handle 42 in its stowed position shown in FIG. 6.

Figure 6:
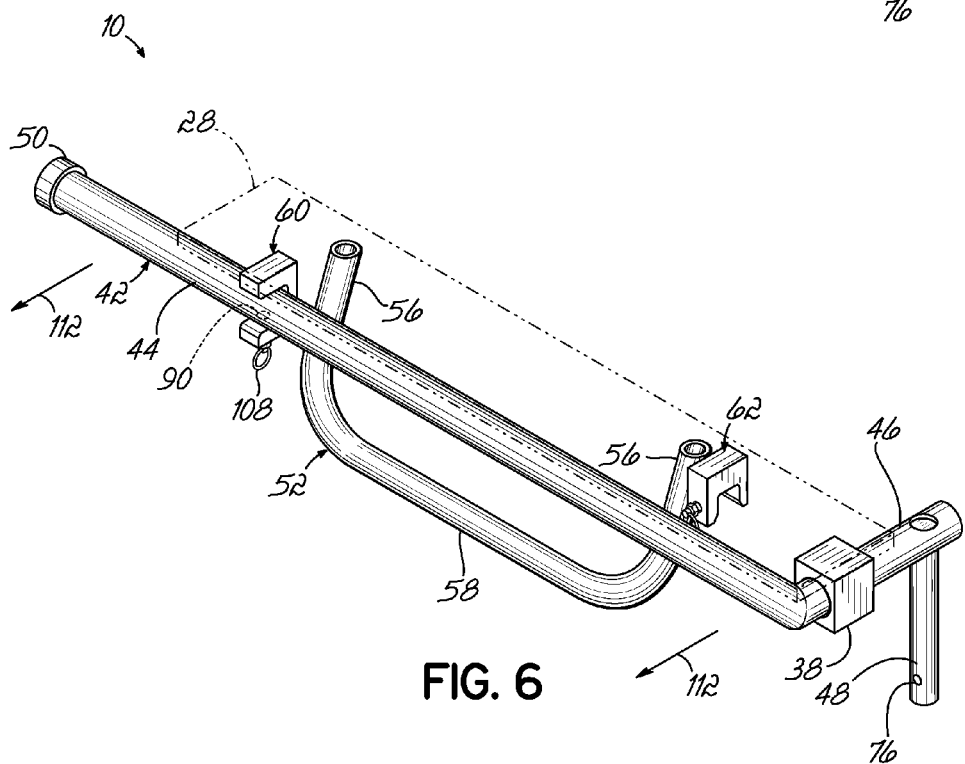
FIG. 6 is a perspective view of a portion of the apparatus of FIG. 1, the handle being in a stowed position.

In order to move the handle 42 from its upright position shown in FIG. 4 to its stowed position shown in FIG. 6, an operator pulls outwardly on the ring 74 of the latch block assembly 62 in the direction of arrow 80 shown in FIG. 4A. The force caused by the pulling on ring 74 forces the flange 78 of plunger 72 to compress the spring 71, as shown in FIG. 4B within hole 70, and causes the plunger 72 to come out of the hole 76 in the tail portion 48 of handle 42. As shown in FIG. 4, the truck operator may then pivot the handle 42 about axis 82 defined by the guide portion 46 of handle 42 in a counter-clockwise direction as shown in FIG. 4. This movement causes the tail portion 48 of handle 42 to disengage from the second latch block assembly 62 or move downwardly in the direction of arrow 84 as shown in FIG. 4B.

Once the tail portion 48 of handle 42 is no longer locked in position by the plunger 72 of the second latch block assembly 62, the handle 42 may be rotated about axis 82 causing the guide portion 46 of handle 42 to rotate within hole 40 in guide block 38. The operator may continue rotating the main portion 44 of handle 42 in the counter-clockwise direction as shown by the arrow 86 in FIG. 4 until the main portion 44 of handle 42 is horizontally oriented as shown in FIG. 5.

Figure 5:
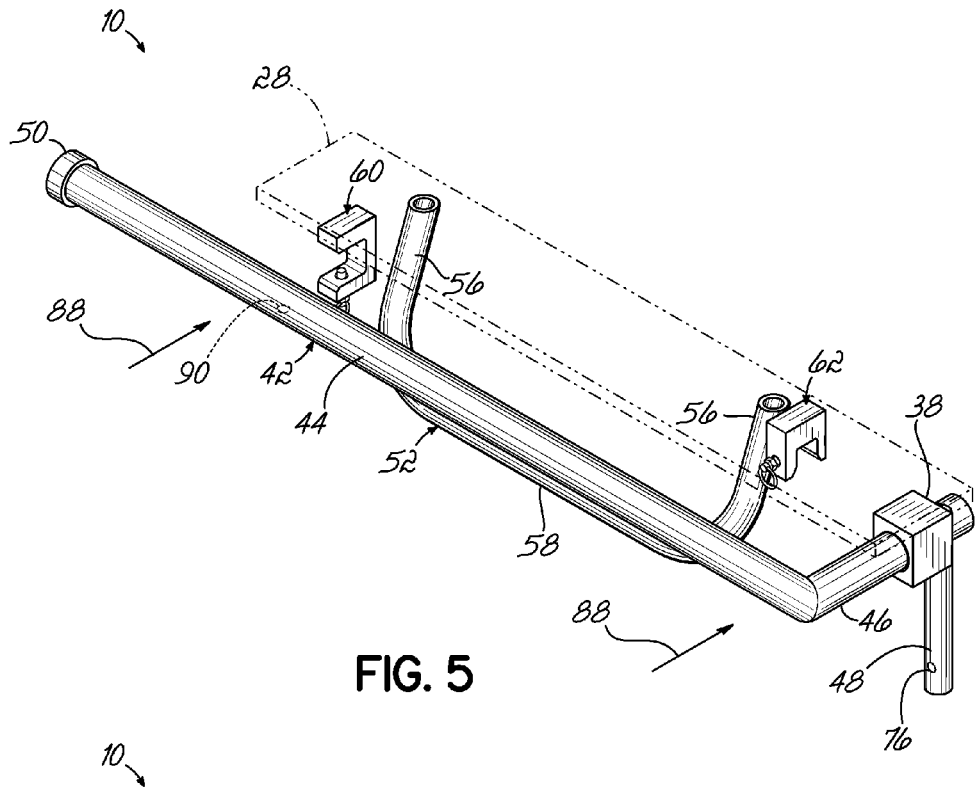
FIG. 5 is a perspective view of a portion of the apparatus of FIG. 1, the handle being moved from an upright position to a stowed position.

In this intermediate position, the operator may then push the main portion 44 of handle 42 in the direction of arrows 88 as shown in FIG. 5, thereby moving the handle 42 in a rearward or inward direction. The guide portion 46 of handle 42 moves within the hole 40 in guide block 38 to a rear position in which the main portion 44 of handle 42 is received inside the gap 99 of the first latch block assembly 60 and the plunger 104 of the first latch block assembly 60 received inside a hole 90 in the main portion 44 of handle 42. When the plunger of the first latch block assembly 60 is received inside a hole 90 in the main portion 44 of handle 42, the handle 42 is locked in its stowed position, as shown in FIG. 6.

In order to move the handle from its stowed position shown in FIG. 6 to its upright position shown in FIG. 4, an operator pulls outwardly on the ring 108 of the first latch block assembly 60 in the direction of arrow 110 shown in FIGS. 4C and 4D. The force caused by the pulling on ring 108 forces the flange 106 of plunger 104 to compress the spring 102 as shown in FIG. 4D within hole 100 and causes the plunger 104 to come out of the hole 90 in the main portion 44 of handle 42. As shown in FIG. 6, the truck operator may then pull the main portion 44 of handle 42 outwardly in the direction of arrows 112 to move the handle 42 to its intermediate position shown in FIG. 5. The handle may then be rotated in a clockwise direction about axis 82 as shown in FIG. 4. This movement causes the tail portion 48 of handle 42 to engage the second latch block assembly 62 and become locked in the upright position shown in FIG. 4.

In use, when the handle 42 is locked in its upright position shown in FIG. 1, a person (shown in phantom in FIG. 1) is able to grasp the main portion 44 of handle 42 and step on step 52 to pull himself/herself into the interior 22 of the trailer 14. The operator may exit the interior 22 of the trailer 14 the same way. The handle 44 may then be moved and locked in its stowed position for travel.

While we have described several preferred embodiments of the present invention, persons skilled in the art will appreciate changes and modifications which may be made without departing from the spirit of the invention. For example, although one configuration of handle is illustrated and described, the handle of the present invention may be other configurations. Therefore, we intend to be limited only by the scope of the following claims and equivalents thereof.

We claim:

1. An apparatus adapted to mount to a truck trailer having a trailer floor and a safety bumper spaced below the trailer floor, said apparatus comprising:
   a mounting plate secured to the trailer;
   a guide block secured to the mounting plate and extending downwardly from the mounting plate;
   a generally U-shaped step secured to the mounting plate, said U-shaped step being located between the trailer floor and the safety bumper; and
   a handle movable between an upright position and a stowed position, wherein said handle may be locked in either of said positions, a portion of said handle passing through an opening in said guide block.

2. The apparatus of claim 1 further comprising a pair of latch block assemblies, each latch block assembly having a spring loaded plunger.

3. The apparatus of claim 1 wherein the generally U-shaped step is welded to the mounting plate.

4. The apparatus of claim 1 wherein the handle has a main portion, a guide portion and a tail portion.

5. The apparatus of claim 2 wherein the handle is locked in one of its upper and lower positions by one of said spring loaded plungers engaging a hole in said handle.

6. The apparatus of claim 4 wherein each of said portions of said handle is straight.

7. The apparatus of claim 1 wherein said tail portion of said handle is locked to one of said latch block assemblies when the handle is in its upright position.

8. The apparatus of claim 1 wherein said main portion of said handle is locked to one of said latch block assemblies when the handle is in its stowed position.

9. The apparatus of claim 1 wherein said handle, in said stowed position, does not protrude past a rear end of the trailer.

10. An apparatus for assisting a person into and out of an interior of a truck trailer, said apparatus comprising:
   a mounting plate secured to the trailer;
   a guide block secured to the mounting plate and extending downwardly from the mounting plate;
   a generally U-shaped step secured to the mounting plate; and
   a handle extending through said guide block, said handle being movable between an upright position and a stowed position, wherein said handle may be locked in one of said positions by a spring loaded plunger.

11. The apparatus of claim 10 wherein said handle, in said stowed position, does not protrude past a rear end of the trailer.

12. The apparatus of claim 10 further comprising a pair of latch block assemblies secured to said mounting plate, each latch block assembly having a spring loaded plunger.

13. The apparatus of claim 10 wherein the generally U-shaped step is welded to the mounting plate.

14. The apparatus of claim 10 wherein the handle has a main portion, a guide portion and a tail portion.

15. The apparatus of claim 14 wherein each of said portions of said handle is straight.

16. The apparatus of claim 12 wherein the guide portion of the handle is perpendicular to the main portion of the handle.

17. The apparatus of claim 12 wherein the tail portion of the handle is perpendicular to the guide portion of the handle.

18. The apparatus of claim 12 wherein said tail portion of said handle is locked to one of said latch block assemblies when the handle is in its upright position.

19. The apparatus of claim 12 wherein said main portion of said handle is locked to one of said latch block assemblies when the handle is in its stowed position.

20. The apparatus of claim 10 wherein the said U-shaped step is located between a floor of the trailer and a safety bumper of the trailer.

\* \* \* \* \*